(12) United States Patent
Krasienapibal et al.

(10) Patent No.: US 11,334,761 B2
(45) Date of Patent: May 17, 2022

(54) INFORMATION PROCESSING SYSTEM AND INFORMATION PROCESSING METHOD

(71) Applicant: HITACHI, LTD., Tokyo (JP)

(72) Inventors: Thantip Krasienapibal, Tokyo (JP); Sayaka Kurata, Tokyo (JP); Momoyo Enyama, Tokyo (JP); Yasuhiro Shirasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 348 days.

(21) Appl. No.: 16/712,568

(22) Filed: Dec. 12, 2019

(65) Prior Publication Data
US 2020/0257937 A1   Aug. 13, 2020

(51) Int. Cl.
*G06K 9/62*     (2022.01)
*G06N 20/00*    (2019.01)
*G06V 10/34*    (2022.01)

(52) U.S. Cl.
CPC ......... *G06K 9/6255* (2013.01); *G06K 9/6263* (2013.01); *G06N 20/00* (2019.01); *G06V 10/34* (2022.01)

(58) Field of Classification Search
CPC . G06T 2207/10032; G06T 2207/20224; G06T 7/00; H04N 13/106; H04N 5/332
See application file for complete search history.

(56) References Cited

U.S. PATENT DOCUMENTS

| 8,045,770 | B2 * | 10/2011 | Reeves | G06T 7/0012 382/128 |
| 8,400,619 | B1 * | 3/2013 | Bachrach | G01C 1/04 356/4.01 |
| 8,452,323 | B2 * | 5/2013 | Anderson | H04W 52/0258 455/522 |

(Continued)

FOREIGN PATENT DOCUMENTS

JP    2017-520864 A    7/2017

OTHER PUBLICATIONS

"Deep Learning for Biomedical Texture Image Analysis", Vincent Andrearczyk et.al, Proceedings of the 18th Irish Machine Vision and Image Processing conference IMVIP 2016.

*Primary Examiner* — Yosef Kassa
(74) *Attorney, Agent, or Firm* — Volpe Koenig

(57) ABSTRACT

An information processing system creates a teacher database configured to train an analysis model from an observation image and labeling information corresponding to the observation image using an information processor. This system includes a storage unit, an image processing unit, and a teacher database creating unit. The storage unit stores image processing data formed of information showing a relationship between an observation condition and a parameter relating to the observation image. Further stores a first observation image, a first observation condition, and first labeling information. The image processing unit accepts the first observation image and the first observation condition as (Continued)

inputs, performs image processing corresponding to the parameter to the first observation image based on the image processing data, and creates a second observation image corresponding to a second observation condition. The teacher database creating unit creates the teacher database from the second observation image and the first labeling information.

15 Claims, 14 Drawing Sheets

(56) References Cited

U.S. PATENT DOCUMENTS

| | | | | |
|---|---|---|---|---|
| 8,577,129 | B2 * | 11/2013 | Reeves | G06T 11/008 |
| | | | | 382/154 |
| 8,768,070 | B2 * | 7/2014 | Gelfand | G06T 11/60 |
| | | | | 382/224 |
| 9,014,500 | B2 * | 4/2015 | Shuster | G06T 5/003 |
| | | | | 382/254 |
| 9,230,333 | B2 * | 1/2016 | Robinson | H04N 19/119 |
| 2017/0032285 | A1 | 2/2017 | Sharma et al. | |

* cited by examiner

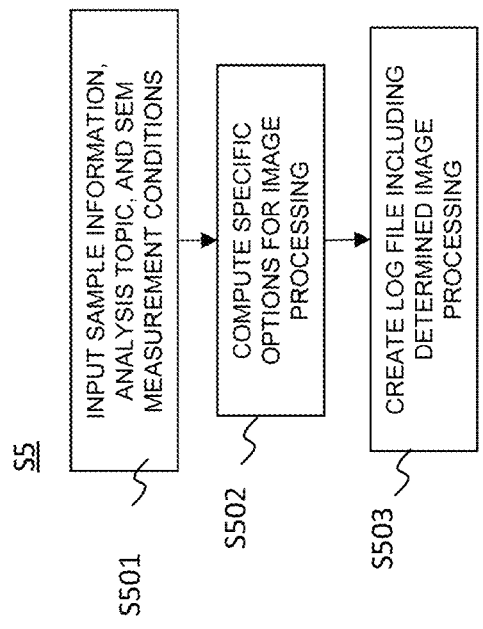

Fig. 6A

| Time stamp | Ip (μA) | $V_{acc}$ (kV) | detector | WD (mm) | Magnification | Image size | ... |
|---|---|---|---|---|---|---|---|
| 2018.01.01 17:38 | 153 | 3 | BSE | 15 | 5000 | 1280*960 | |
| 2018.01.01 17:40 | 152 | 3 | BSE | 15 | 5000 | 1280*960 | |
| 2018.01.01 17:42 | 153 | 3 | SE | 15 | 500 | 1280*960 | |
| ... | | | | | | | |

601

Ip: Electron Probe current
$V_{acc}$: Acceleration voltage
WD: working distance

Fig. 6B

| Time stamp | Ip (μA) | $V_{acc}$ (kV) | detector | WD (mm) | Magnification | Image size | ... |
|---|---|---|---|---|---|---|---|
| 2018.01.01 17:38 | 153 | 3 | BSE | 5 | 5000 | 1280*960 | |
| 2018.01.01 17:38 | 153 | 3 | BSE | 10 | 5000 | 1280*960 | |
| 2018.01.01 17:38 | 153 | 3 | BSE | 20 | 5000 | 1280*960 | |
| ... | ... | | | | | | |

Ip: Electron Probe current
$V_{acc}$: Acceleration voltage
WD: working distance

602

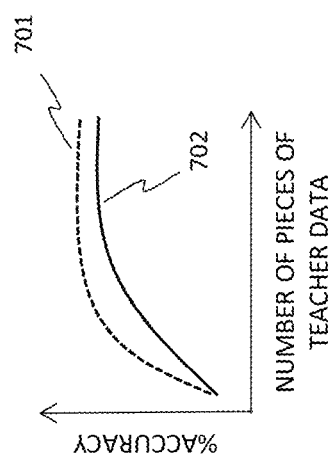

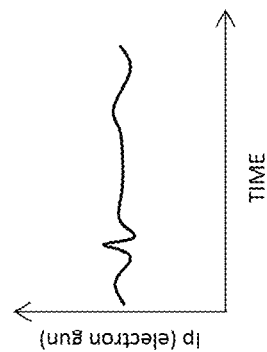

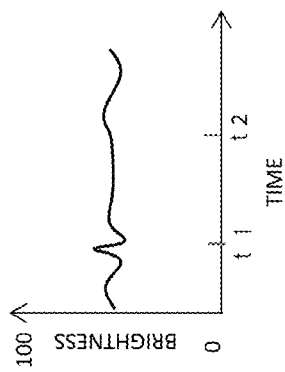

INFORMATION PROCESSING SYSTEM AND INFORMATION PROCESSING METHOD

TECHNICAL FIELD

The present invention of the present application relates to an information processing technique, and more specifically to an image sorting technique using machine learning.

BACKGROUND OF THE INVENTION

Conventionally, in order to identify the substance structure, for example, of a sample based on the images of the sample taken by a scanning electron microscope (SEM), for example, generally, the images have been visually confirmed. In this case, accurate determination is difficult due to differences in recognition depending on people or the influence of an ambient environment. The burden of operators and costs also cause problems.

The research and development of image processing techniques are advancing, together with the improvement of the performance of computer nowadays, especially the improvement of artificial intelligence (AI) techniques. In image processing using a hierarchical neural network that is a typical technique in this field, the weight of connection of the hierarchical neural network is optimized, and hence processing, referred to as machine learning configuring a model that conforms to target processing, is performed.

The machine learning using a hierarchical neural network is roughly categorized into supervised learning and unsupervised learning. In supervised learning, a database (in the following, referred to as "a teacher database") is constructed using a set of pairs of an input x and a correct output t for the input x as training data (in the following, referred to as "teacher data"). In machine learning, the weight of connection of the hierarchical neural network is adjusted such that an output when a predetermined input is made to the hierarchical neural network comes close to a correct solution using the teacher database. An appropriately trained model can highly accurately output a correct solution to an input.

Japanese Unexamined Patent Application Publication (Translation of PCT Application) No. 2017-520864 describes "A method of classifying microscopic images includes receiving a containing training data set including at least one microscopic image from an object and an associated class definition of the image based on the product specifications. A machine learning classifier is trained so as to classify images into classes. The microscopic image is used as a test input of the classifier, and the image is classified into one or a plurality of classes based on the product specifications. The product specifications include a brand name, product line, or other details on the label of the object."

"Deep Learning for Biomedical Texture Image Analysis", Vincent Andrearczyk et.al, Proceedings of the 18th Irish Machine Vision and Image Processing conference IMVIP, 2016 describes that in the analysis of a texture image using a repetition pattern, an inputted image is classified using a voting score.

SUMMARY OF THE INVENTION

Image identification using the appropriately trained model makes efficient, accurate analysis of a substance structure possible. However, the preparation of an appropriate teacher database for training a model is a premise. The requirements as a teacher database are quantity and quality. That is, it is necessary that the patterns of images that are possibly processed targets are widely included and appropriate correct solutions are attached to the patterns.

For example, in the case where analysis is to be performed using images of a sample taken by an electron microscope, for example, even though the same sample is targeted, taken images are varied depending on various imaging conditions such as an electron microscope. In the case of using images as teacher data acquired by an SEM, for example, in order to prepare an ideal teacher database, a large amount of SEM images including various imaging conditions that are assumed have to be acquired, and costs for acquiring SEM images are to be problems. Therefore, a method of constructing a large-scale teacher database from a small amount of images is important.

A preferable aspect of the present invention is an information processing system that creates a teacher database configured to train an analysis model from an observation image and labeling information corresponding to the observation image using an information processor. This system includes a storage unit, an image processing unit, and a teacher database creating unit. The storage unit stores image processing data formed of information showing a relationship between an observation condition for the observation image and a parameter relating to the observation image. The storage unit stores a first observation image, a first observation condition corresponding to the first observation image, and first labeling information corresponding to the first observation image. The image processing unit accepts the first observation image and the first observation condition as inputs, performs image processing corresponding to the parameter to the first observation image based on the image processing data, and creates a second observation image corresponding to a second observation condition. The teacher database creating unit creates the teacher database from the second observation image and the first labeling information.

Another preferable aspect of the present invention is an information processing method of creating a teacher database configured to train an analysis model from an observation image and labeling information corresponding to the observation image using an information processor. This method uses a storage unit, an image processing unit, and a teacher database creating unit. The storage unit stores image processing data formed of information showing a relationship between an observation condition for the observation image and a parameter relating to the observation image. The storage unit stores a first observation image, a first observation condition corresponding to the first observation image, and first labeling information corresponding to the first observation image. The image processing unit accepts the first observation image and the first observation condition as inputs, performs image processing corresponding to the parameter to the first observation image based on the image processing data, and creates a second observation image corresponding to a second observation condition. The teacher database creating unit creates the teacher database from the second observation image and the first labeling information.

Specific examples of parameters relating to an observation image include the parameters of an image (e.g. brightness) or the parameters of the image processing (e.g. the tuning parameter of brightness).

According to the invention, a large-scale teacher database can be constructed from a small amount of images.

BRIEF DESCRIPTION OF THE DRAWINGS

FIG. 5A is a flowchart showing a flow of processing that determines an image processing method for an image;

FIG. 6A is a graph diagram showing history data;

FIG. 6B is a graph diagram showing output data;

FIG. 7 is a graph diagram showing the effect of the embodiment;

FIG. 11A is a graph diagram showing the relationship between the operating time of an SEM and an electric current of an electron gun; and FIG. 11B is a graph diagram showing the relationship between the operating time t of the SEM and the brightness of the SEM image.

DETAILED DESCRIPTION

Figure 1:
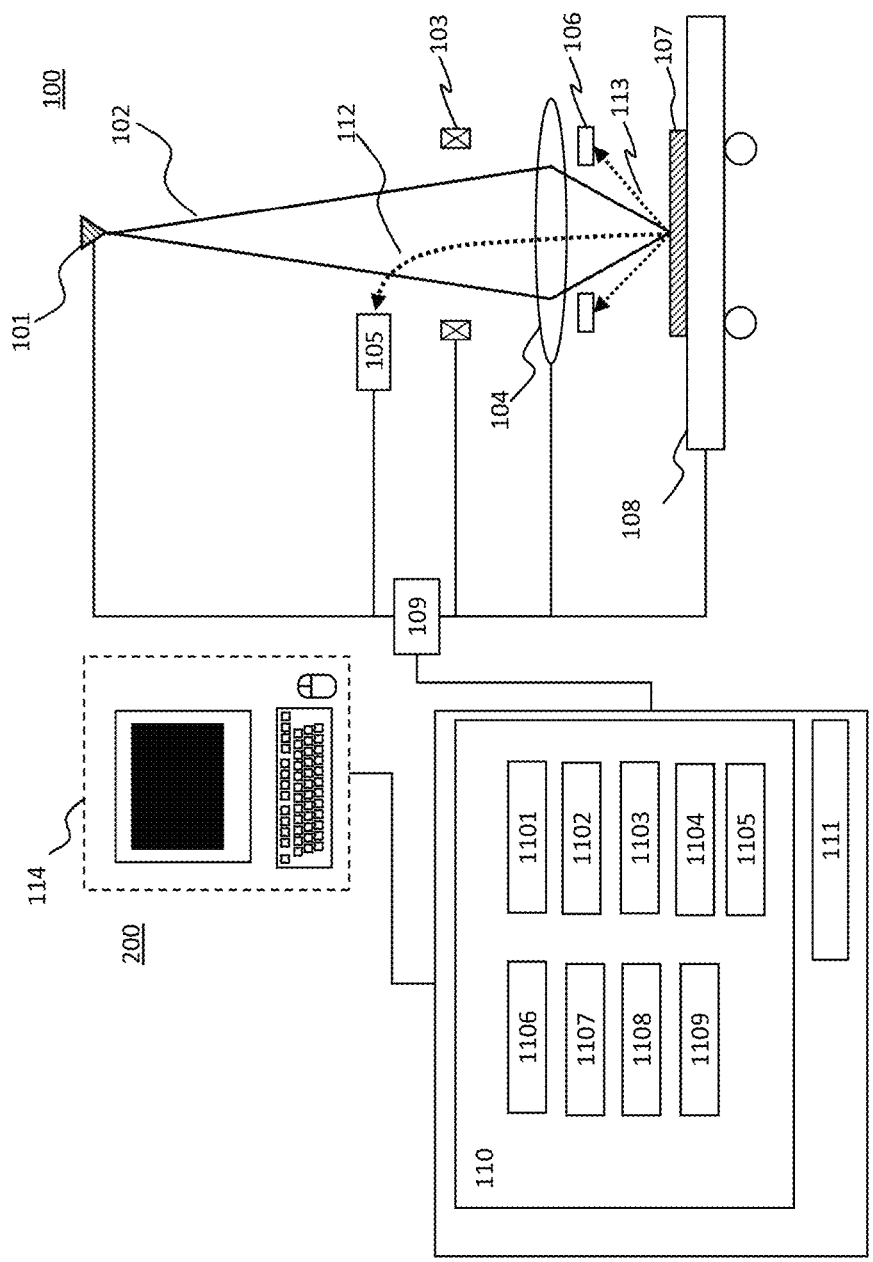
FIG. 1 is a block diagram of the configuration of a substance structure analysis system according to an embodiment.

Embodiments will be described in detail with reference to the drawings. However, the present invention should not be interpreted in the limitation of the written content of the embodiments shown below. A person skilled in the art would easily understand that the specific configurations of the present invention can be modified and altered within the range not deviating from the idea and gist of the present invention.

In the configuration of the present invention described below, for the same parts or the parts having similar functions, the same reference signs are shared in different drawings, and the duplicate description is sometimes omitted.

In the case where there is a plurality of elements having the same or similar functions, the description may be made with different subscripts added to the same reference signs. However, in the case where there is no need to distinguish between a plurality of elements, the description may be made with subscripts omitted.

The notations, such as "first", "second", and "third", are written for identification of components, and do not necessarily limit the number, order, or content of the components. The numbers for identification of components are used for each context. The number used in one context does not always show the same configuration in another context. A component identified by a certain number is not prevented from also serving the function of a component identified by another number.

The location, size, shape, and range, for example, of each configuration do not always express the actual location, size, shape, and range, for example, for easy understanding of the present invention. Thus, the present invention is not necessarily limited to the location, size, shape, and range, for example, disclosed in the drawings, for example.

Publications, patents, and patent applications cited in the present specification compose a part of the description of the present specification as they are.

Components expressed in a singular form in the present specification include a plural form, unless otherwise specified.

First Embodiment

<1. Overall Structure of a System>

FIG. 1 is a block diagram of the configuration of a substance structure analysis system according to an embodiment. The substance structure analysis system in FIG. 1 is basically composed of an observation device for image acquisition, such as an SEM, (an imaging device) and an information processor, such as a server.

In the embodiment, an example is described in which an SEM is used as an imaging device. The SEM 100 includes an electron gun 101, and primary electrons 102 are emitted from the electron gun 101. The primary electrons 102 are applied to a sample 107 through a scanning coil 103 and an objective lens 104. As is generally known, the primary electrons 102 are applied to the desired spot on the sample 107 placed on a sample stage 108 by the scanning coil 103, and can entirely scan the sample 107. The sample 107 to which the primary electrons 102 are applied emits emission electrons 112 and 113, and the emission electrons 112 and 113 are detected at detectors 105 and 106. These are typical SEM configurations.

In the embodiment, the SEM 100 is controlled by a server 200. Similarly to a typical server, the server 200 includes an input device, an output device, a processor, and a storage device. In the embodiment, functions such as computation or control are implemented in cooperation of predetermined processes with other hardware by execution of programs stored on the storage device by the processor. The programs executed by a computer, for example, its functions, or unit that implements the functions, and some or all the storage devices that store data or database are sometimes referred to as a "xx part", "function", and "unit", for example.

The configuration of the server 200 may be configured of one server, or the server 200 may be configured of a plurality of servers having a given part of an input device, an output device, a processor, and a storage device connected via a network. In the embodiment, functions equivalent to the functions configured of software can also be implemented using hardware, such as an FPGA (Field Programmable Gate Array) and an ASIC (Application Specific Integrated Circuit).

The physical configuration of the server 200 is as described above. However, FIG. 1 shows the physical configuration as a functional block diagram with attention focused on functional features. An SEM system control unit 109 is a part that controls the SEM 100 according to an instruction from the server 200, and includes an interface that transmits and receives commands or data between the SEM 100 and the server 200. The storage unit 110 stores software or various items of data. The processing unit 111 executes the software stored on the storage unit 110, and performs various processes.

A terminal 114 includes an input device and an output device that accept an input from a user or output information to the user. The input device and the output device may be a known input device, such as a keyboard and a mouse, and a known output device, such as an image display device. The terminal 114 may include other functions, such as a printing function and a communication function. The terminal 114 may include an interface that inputs images from device, such as another electron microscope or a video camera and a data storage device. In the embodiment, the description is made in which the image to be a processed target is an SEM image. However, the image is not limited to this.

The storage unit 110 is composed of a magnetic disk device and a semiconductor memory device, or the combination of these devices. In the embodiment, the storage unit 110 stores the following information.

As the database:

(1) A metafile 1101 including an SEM image observed by the SEM 100 and history data (the material information, the SEM observation conditions, and any other data) in the observation by the SEM 100 (the metafile 1101 will be described in FIG. 6A later).

(2) Image processing data 1102 including information that processes SEM images (e.g. expressions that compute parameters for image processing). Expressions are automatically or manually generated from information in the metafile 1101. Alternatively, expressions may be created by the user. Examples of expressions will be described later.

(3) A labelled SEM image 1103. The labelled SEM image is data that the SEM image is labelled. This data is associated with the SEM image in the metafile 1101. Alternatively, the labelled SEM image may be configured as a part of the metafile 1101. Alternatively, the labelled SEM image may be configured as a separate metafile.

Labeling is the segmentation of the SEM image, for example, (region classification). Alternatively, labeling is that a specific feature part of the SEM image is marked (extracted). The labelled SEM image is used for creating teacher data that trains a model or accuracy measurement data that measures the effect of training. In the embodiment, as the labelled SEM image, both of an SEM image acquired from the SEM (in the following, sometimes referred to as "an original image") and an image that the SEM image is subjected to image processing (in the following, sometimes referred to as "a processed image") are used.

(4) An output file 1104 formed of a log file that records what image processing is applied to an SEM image (an original image) and an SEM image (a processed image) to which image processing is applied. The output file 1104 may be configured as a metafile (the output file 1104 will be described in FIG. 6B later).

(5) A knowledge database 1105 that stores existing knowledge relating to the composition and crystal structure of a material.

Information for automatic analysis by an analysis model using a hierarchical neural network:

(6) A teacher database 1106 including teacher data created from the labelled SEM image or accuracy measurement data in addition to the teacher data.

(7) A model training unit 1107 that learns the hierarchical neural network using the teacher database 1106 and generates an analysis model.

(8) A trained model storage unit 1108 that stores a trained analysis model.

(9) An image analysis unit 1109 that analyzes an SEM image to be an analysis target using the trained analysis model.

For these configurations for automatic analysis, publicly known techniques can be used, including a method using an analysis model configured of a neural network having an input layer corresponding to a pixel number, for example.

<2. Overall Process Flow of the System>

Figure 2:
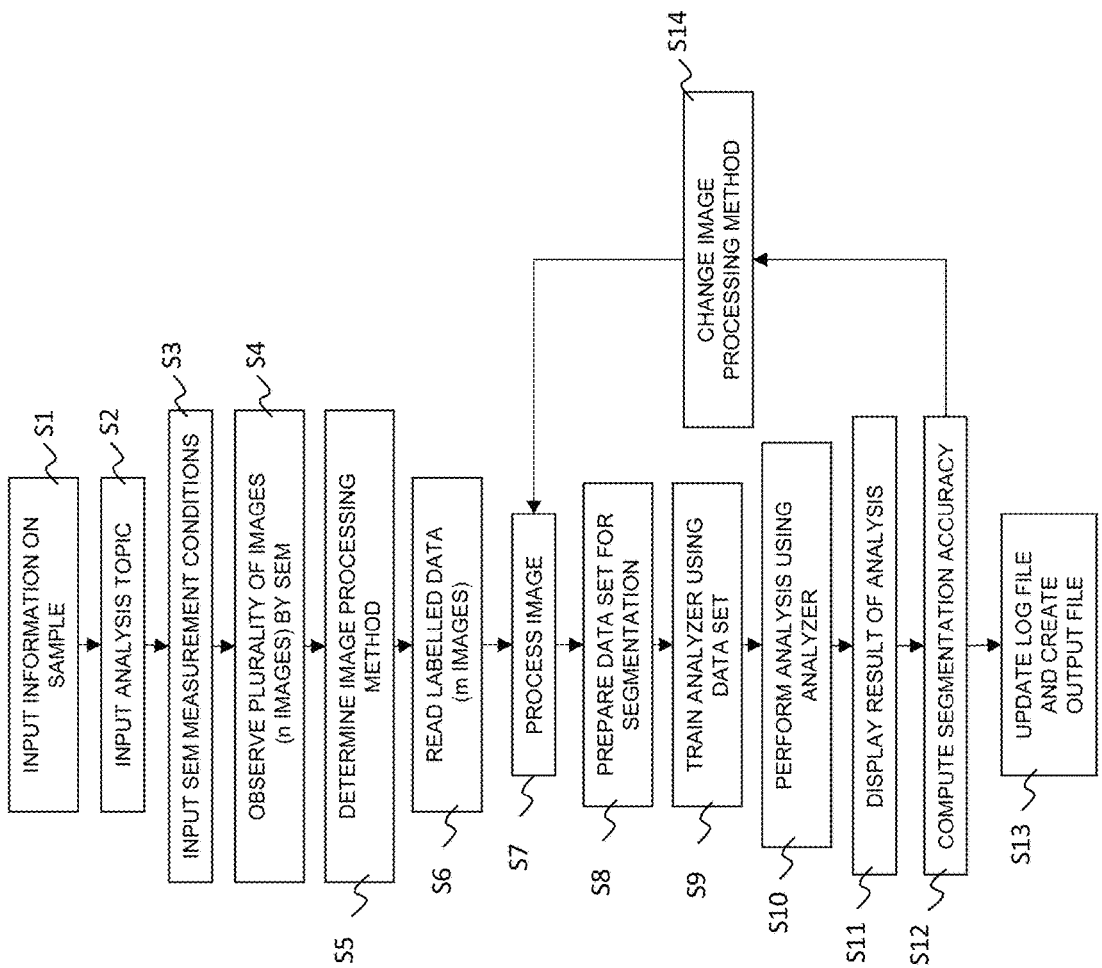
FIG. 2 is a flowchart of substance structure analysis showing processing by the substance structure analysis system.

FIG. 2 is a flowchart of substance structure analysis showing processing by the substance structure analysis system in FIG. 1. In the embodiment, the following flow shows an example that collectively preparing all of an SEM image for teacher data, an SEM image for generating accuracy measurement data, and an SEM image to be an analysis target. However, at least a part of an SEM image for teacher data, an SEM image for generating accuracy measurement data, and an SEM image to be an analysis target may be prepared at another timing by another system.

<2-1. Input of Sample Information and Analysis Topics (Processes S1 and S2)>

In FIG. 2, first, the user inputs information on the sample 107 to be an analysis target from the terminal 114 (S1). Subsequently, the user inputs an analysis topic from the terminal 114 (S2). The analysis topic is the theme of analysis, i.e., an analysis item that is a crystal structure or a type of phase desired to be identified in the SEM image, for example. For the hierarchical neural network learned later, an appropriate one may be selected from a plurality of hierarchical neural networks corresponding to the inputted analysis topic.

Figure 3:
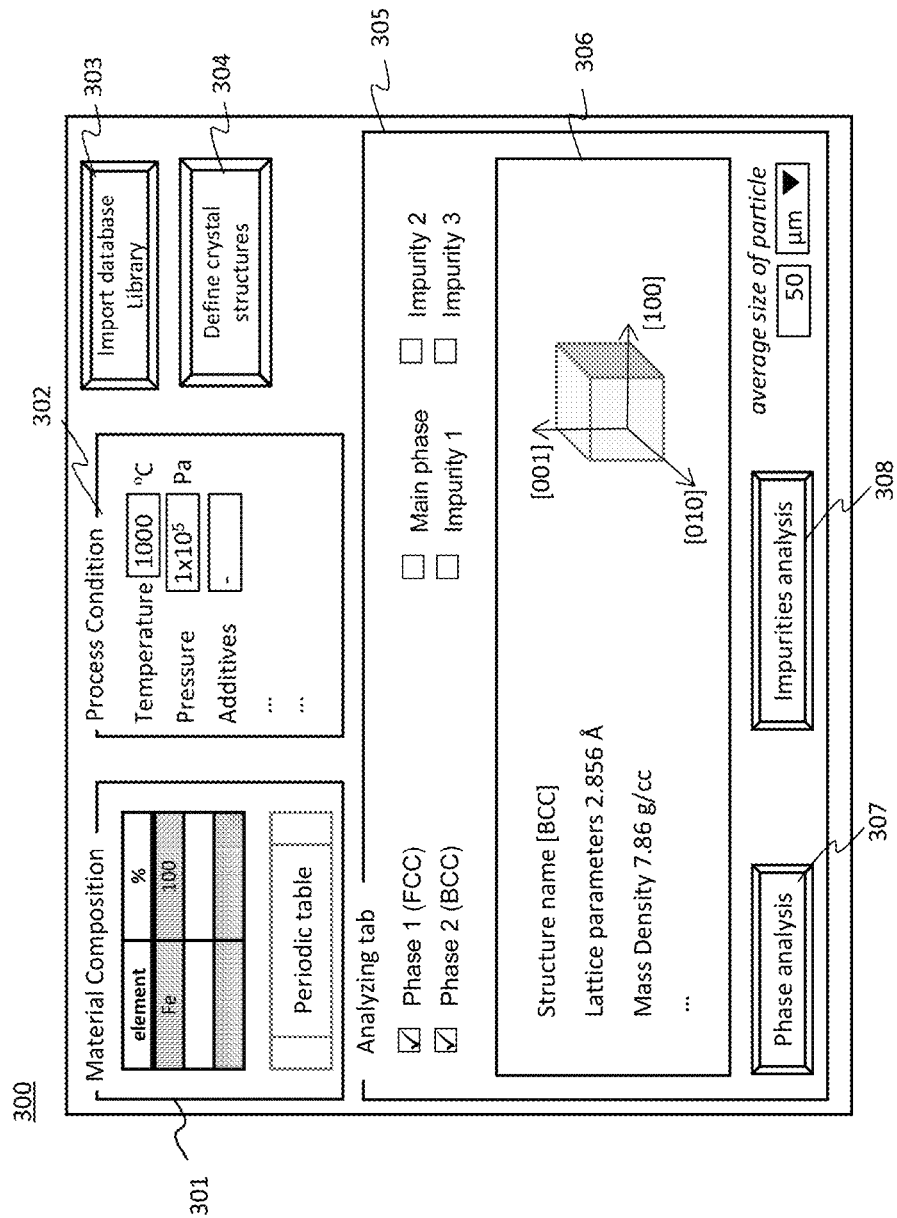
FIG. 3 is a conceptual diagram of a GUI that inputs information on a sample and analysis topics.

FIG. 3 shows a graphical user interface (GUI) displayed to the user through the terminal 114 in order to input information on the sample and the analysis topic.

On a GUI window 300, a plurality of small windows 301, 302, 305, and 306 are displayed. For example, to the small window 301, a material composition is inputted. The composition can be inputted by specifying an element with reference to a periodic table. To the small window 302, a process condition for the sample 107 can be inputted. As the conditions, there are temperature, pressure, and additives, for example. The user can input information on the sample 107 using these conditions.

By operating an operating button 303 (Import database Library), known structure data corresponding to the inputted information on the sample 107 can be read from the knowledge database 1105. The structure data is displayed on the small window 306. With the structure data, an analysis item corresponding to the structure is associated. The small window 305 is an analyzing tab, and presents analysis item candidates corresponding to the structure data of the sample read out of the knowledge database 1105. The user can select a desired item from the presented analysis item candidates.

In the example in FIG. 3, phase analysis (Phase analysis) and impurity analysis (Impurity) can be selected by operation buttons 307 and 308. Phase analysis is analysis that discriminates between crystalline phases in the sample. In phase analysis, the crystal structure read out of the knowledge database 1105 corresponding to the inputted information on the sample 107 is displayed on the small window 306. The user specifies the discrimination between a first phase (face-centered cubic: FCC) and a second phase (body-centered cubic: BCC), for example. In impurity analysis, the discrimination between a main phase and an impurity present in the main phase is made. The user specifies a type of impurity, for example.

The identification of these is finally performed by analysis model according to the hierarchical neural network subjected to machine learning for the identification by operating an operation button (Start segmentation) 407. In phase analysis, the first phase and the second phase in the image are identified by segmentation using the analysis model. In impurity analysis, on an impurity present in the main phase, the impurity (or a deposit) and the main phase are identified. Note that the analysis item does not have to be limited to this. The crystal structure can also be defined by the user with an operation button 304 (Define crystal structures).

Other information like the average size of particles (average size of particles) can be Inputted.

<2-2. Input of Observation Conditions and Acquisition of the SEM Image (Processes S3 and S4)>

Subsequently, the user inputs the measurement conditions (the observation conditions) for the SEM 100 (S3). As is generally known, as the SEM observation conditions, there are various conditions such as magnification, an observation range, a working distance (a distance from the objective lens 104 to the surface of the sample 107), the tilt angle of the sample stage 108, and an operating voltage or an electric current of the electrode of the electron gun 101. However, the conditions may be freely selected.

Figure 4:
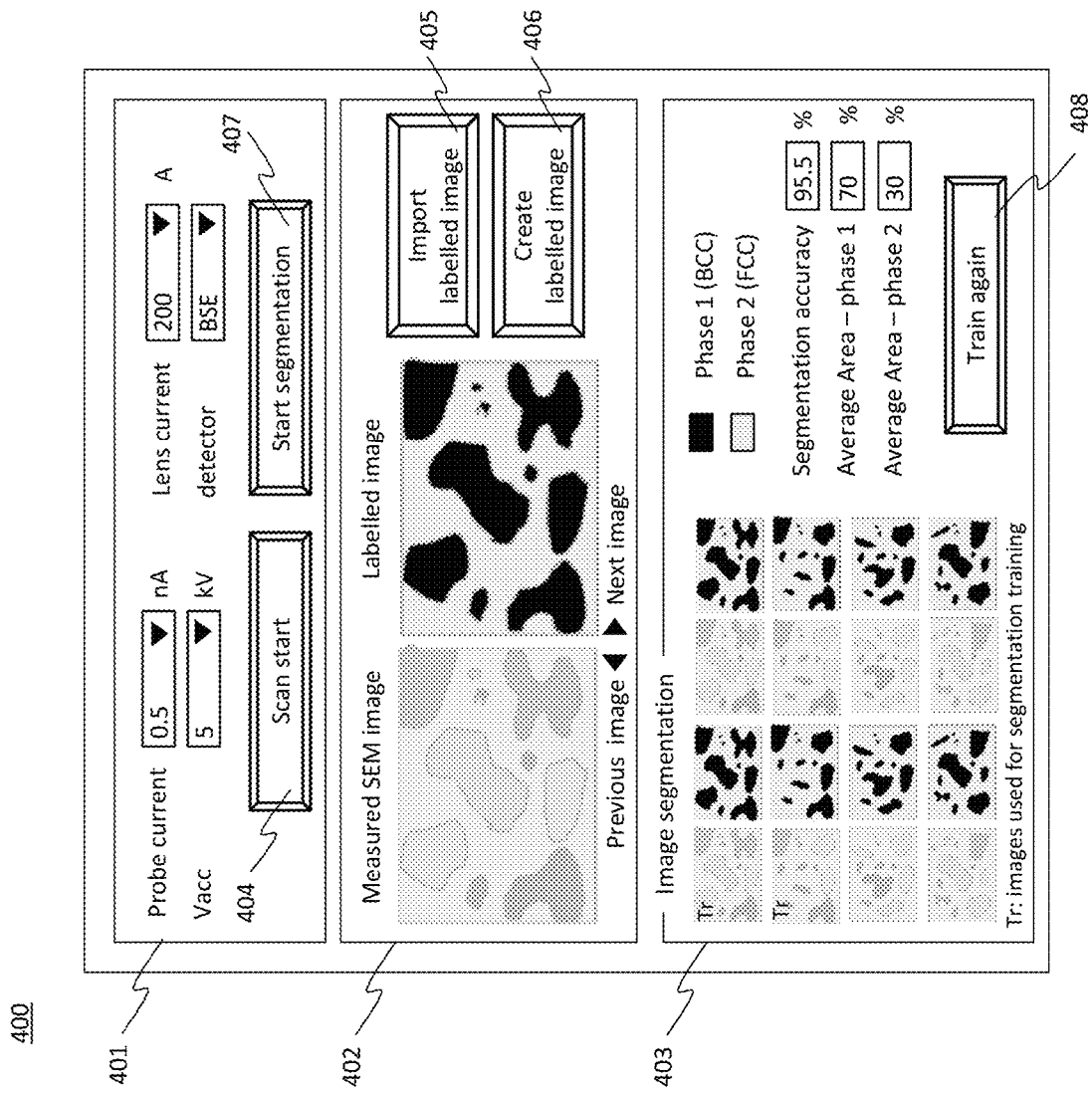
FIG. 4 is a conceptual diagram of a GUI that inputs observation conditions.

FIG. 4 is an example of a GUI displayed to the user through the terminal 114 in order to input observation conditions. On a GUI window 400, a small window 401 is displayed. The user inputs observation conditions for the SEM 100 to the small window 401 using the terminal 114. In FIG. 4, the observation conditions are the electric current (Probe current) of the electron gun, an accelerating voltage (Vacc) that extracts electrons from the electron gun, the operation current of the objective lens (Lens current), the operation method of the detector, and a distinction between a backscattered electron (BSE: backscattered electron) image and a secondary electron (SE: Secondary Electron) image, for example. The other observation conditions such as the working distance (WD) may be inputted or automatically acquired. These observation conditions are history data that records SEM operation history.

After setting the observation conditions, by operating an operation button (Scan start) 404, the SEM 100 observes the sample 107 under the specified conditions, and acquires a plurality (n images) of SEM images (S4). n is a natural number, and is three or more, for example. Although not limited specifically, in the case where there are three SEM images, for example, one image can be used for teacher data, one image can be used for accuracy confirmation data of an analyzer, and one image can be used for an analysis target. The acquired SEM image is stored on the storage unit 110 in association of history data having SEM operation history recorded with the metafile 1101 (history data will be described in FIG. 6A).

<2-3. Labeling of the SEM Image (Included in Process S4 or Separately Performed)>

As described later in detail, here, a part of the acquired SEM image is labelled, and can be used for teacher data or accuracy confirmation data. Data stored as the labelled SEM image 1103 in the past can also be invoked for reuse.

A method of obtaining labelled data using the GUI window 400 in FIG. 4 will be described. In the case where in a small window 402, a material that is about to be presently analyzed or a labelled SEM image conforming to an analysis topic is already stored on the labelled SEM image 1103 of the storage unit 110, conforming data is invoked by an operation button 405 (Import labelled image).

The SEM image observed in Process S4 can also be labelled uninterruptedly using the GUI window 400 as a part of Process S4. In this case, an SEM image (Measured SEM image) is displayed on the small window 402. Labeling is to be performed such that the user visually views SEM images. An SEM image (Labelled image) is generated using a pointing device, for example. In FIG. 4, the SEM image is labelled, being divided into two parts, a first phase (darkish parts in the image) and a second phase (whitish parts in the image) by user specification. The labelled SEM image (Labelled image) is stored as the labelled SEM image 1103 on the storage unit 110 using the operation button 406 (Create labelled image).

<2-4. Determination of an Image Processing Method and Image Processing (Processes S5 to S7)>

Subsequently, the processing unit 111 of the server 200 recommends the user to an image processing method for the SEM image (Image) through the terminal 114 or determines an image processing method (S5). In the embodiment, the processing unit 111 automatically determines an image processing method based on a predetermined rule.

FIG. 5A is a diagram showing the flow of Process S5 of determining an image processing method for an image. First, the processing unit 111 inputs the sample information, the analysis topic, and the SEM observation conditions inputted in Processes S1 to S3 (S501). Subsequently, the processing unit 111 computes specific options for image processing (processing methods or parameters, for example) using the image processing data 1102 (S502). Subsequently, a log file on which the determined image processing is recorded is created (S503).

Again referring to FIG. 2, the description of the process flow is continued. After the processing method is determined in Process S5, the processing unit 111 reads labelled data from the labelled SEM image 1103 (S6). The number of pieces of data to be read is m. The labelled data has a pair of an SEM image and labeling based on the theme of analysis. As described before as a part of Process S4, for the labelled SEM image, the user labels an SEM image, visually viewing the SEM image. Alternatively, a configuration may be provided in which an SEM image is acquired from a material, having a known structure and the known structure is attached as a label. Labeling may be performed as a part of the flow in FIG. 2, or may be performed in advance prior to the flow in FIG. 2.

Subsequently, the processing unit 111 of the server 200 processes the labelled SEM image (the original image) by the processing method determined in Process S5, and obtains a processed image (S7). By this process, the number of original images is increased from m images. For example, in the case where the shading amount is changed, new images (processed images) that are m×3 can be obtained by changing WD in Expression 1 by three ways. Since the taken target is the same, the processed image can be labelled similarly to the original image. Therefore, the labelled SEM image is increased four times the number of original images, as the number of original images (m)+ the number of processed images (m×3)=m×4.

In the following, Processes S5 to S7 will be described in detail as a specific example is shown.

In the embodiment, an example will be described in which the shading state of the SEM image acquired in Process S4 is changed by image processing and a processed image is created. Shading means a phenomenon in which a part of the SEM image is shadowed due to the positional relationship between the sample and the objective lens or the detector.

Figure 5B:
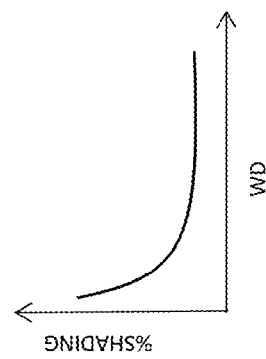
FIG. 5B is a graph diagram showing the relationship between WD and shading.

As an example, FIG. 5B is a graph diagram showing the working distance (WD) on the horizontal axis and the shading amount (%) on the vertical axis. For example, the shading amount is defined by the difference of brightness between the left and right of the image or between a corner and a corner opposite to that corner. In the case where the brightness is 256 gray scale, a shading amount of 0% is achieved when the difference is zero, and a shading amount of 100% is achieved when the difference is 255.

The image processing data 1102 stores an expression below, for example.

$$\text{Shading correction} \propto f1(WD) \times A_{sample,det} \quad \text{Expression 1}$$

Shading correction is a correction parameter for creating an image without shading from an image with shading (a correction amount of brightness for each pixel).

WD is a working distance between the objective lens and the sample.

f1 is a function depending on the SEM.

$A_{sample,\ det}$ is an angle formed by the detector and the sample.

Since shading is the uneven brightness of the SEM image, the correction parameter can be defined as a two-dimensional filter having a brightness difference that cancels uneven brightness. The correction parameter for a predetermined pixel can be computed like Expression 1 described above. Although Expression 1 depends on the specifications of the SEM for use, specification is possible by simulation or experiment. $A_{sample,\ det}$ can be uniquely determined from the specifications of the SEM device and WD. Although $A_{sample,\ det}$ is changed due to a change in the sample position after a change in WD in general, $A_{sample,\ det}$ is constant when WD is constant. f1 is a function depending on the SEM device, and specification is possible by simulation or experiment.

Since the specifications of the SEM are known, the ranges that WD and $A_{sample,\ det}$ can take are known. Since the observation conditions in original image acquisition are inputted in Process S3 and recorded as the history data on the metafile 1101, the observation conditions are known. Therefore, from Expression 1, the SEM image (the processed image) obtained under the observation conditions other than the conditions in the acquisition of the SEM image (the original image) can be created by processing the original image. In the embodiment, in this manner, the SEM image (the processed image) under different observation conditions can be created from the original image.

A specific example of Process S502 according to the embodiment will be described. In this example, the processing unit 111 automatically determines a processing method based on a predetermined rule. First, the processing unit 111 substitutes the observation condition (WD) for the original image inputted in Process S501 into Expression 1 to compute a correction amount, and a first filter that creates an SEM image without shading (the shading amount is zero) from the original image with shading.

The processing unit 111 predetermines one or a plurality of observation conditions (specifically, WD) under which weak shading occurs to the image without shading based on a predetermined rule, and stores the observation conditions on the storage unit 110 (or the user sets the observation conditions on the terminal 114). In Process S502, the observation conditions (WD) is applied to Expression 1, and generates one or a plurality of second filters having reverse characteristics to the obtained correction amount. In Process S503, the first and the second filters are recorded as the content of image processing on the log file.

Subsequently, in Process S6, the processing unit 111 reads m labelled SEM images (m original images) for image processing.

In the subsequent image processing in Process S7, image processing is performed using the first and second filters determined as content of image processing in Process S5. First, the first filter is applied to the original image, an SEM image having a shading amount of zero is created. Subsequently, one or a plurality of second filters are applied to the SEM image having a shading amount of zero, and one or a plurality of SEM images that weak shading occurs are created, with the second filter, the correction amount inverted to the found correction amount, (e.g. s correction amount that Inverts the sign of the correction amount) is applied to the SEM image without shading, and hence a processed image with shading can be created.

By the processes above, one or a plurality of processed images can be obtained from one original image. Although an SEM image with strong shading is not suited to analysis, the obtained processed image has variations under the conditions of weak shading suited to analysis, and hence the obtained processed image is suited as teacher data.

<2-5. Exemplary Configuration of the Metafile>

FIG. 6A shows exemplary history data 601 that is a part of the metafile 1101, on which SEM operation history is recorded. Such history data is recorded on the storage unit 110 in association with the SEM image (the original image). Since the SEM observation conditions of the acquired SEM image is known from history data, a large number of processed images can be created using an SEM image in the past, as an original image.

FIG. 6B shows exemplary output data 602 that is a part of the output file 1104. Such output data is recorded on the storage unit 110 in association with the SEM image (the processed image). Although the output data 602 inherits the content of history data of the original image, data on the part where parameters are changed by image processing is changed.

For example, the images in FIG. 6B are processed images in which the WD of images in the first column in FIG. 6A is changed to adjust shading. In data, the processed image can be used as teacher data or accuracy measurement data similarly to the original image. That is, according to the embodiment, the amount of images to be the materials for the teacher database can foe greatly increased. Although not shown in the drawing, the content of image processing in which the original image is processed is associated with the individual images of the output, data 602.

<2-6. Training of the Analysis Model (Processes S8 and S9)>

Subsequently, a data set for segmentation is prepared using the labelled SEM images increased by image processing. This data is teacher data that learns the hierarchical neural network and accuracy measurement data, for example. The detail of the machine learning of the hierarchical neural network is omitted because this is known. Each of the labelled SEM images whose number is increased is an input x, and a teacher data set or an accuracy measurement data set is generated, which is formed of a correct output t for the input x making a pair (S8). A set of the teacher data sets or a set of the accuracy measurement data sets is stored as the teacher database 1106 on the storage unit 110. In the embodiment, the teacher database 1106 is a set of labelled SEM images having SEM images and labeling information as a data set.

The model training unit 1107 performs machine learning such that an output is brought close to a correct solution using the teacher data set as the input of the hierarchical neural network/and creates a model (S9). The created model is stored on the trained model storage unit 1103 of the storage unit 110.

<2-7. Analysis and Accuracy Measurement by the Analyzer (Processes S10 to S13)>

Subsequently, the image analysis unit 1109 analyzes the accuracy measurement data set generated similarly to the teacher data set from the labelled SEM images using the model, that has completed machine learning (S10). The result of analysis is displayed (S11). The result of analysis of the accuracy measurement data set is checked up to a correct solution, and segmentation accuracy is computed (S12). After a series of processes is ended, the log file is updated, and an output file is created (S13).

Although the accuracy measurement data set has to be data that knows a correct solution, the accuracy measurement data set is desirably data generated from original images different from the teacher data set. This is because when the same original images are used, accuracy is prone to be evaluated higher than an accurate evaluation.

A method of displaying the result of analysis will be described using the GUI window 400 in FIG. 4. The result of analysis is displayed on the small window 403. In FIG. 4, a segmentation result: (Image segmentation) having eight SEM images is shown. Of these eight images, SEM images with "Tr" displayed are SEM images used for training. Therefore, for segmentation, correct solutions are displayed. The other six images are SEM images analyzed for accuracy evaluation. On the right side of the small window 403, accuracy (Segmentation accuracy), the ratio of the first phase (Average Area-phase 1), the ratio of the second phase (Average Area-phase 2), for example, are displayed. In the case where accuracy is low, machine learning is again performed using an operation button 408 (Train again). Generally, repeating machine learning can improve the accuracy of the model.

<3. Effect of the Embodiment>

By the processes described above process, a large-scale teacher database can be created from a small number of original images. Accordingly, the analysis model can be trained with a small cost.

FIG. 7 is a graph showing the effect of the embodiment. The horizontal axis is the number of pieces of teacher data, and the vertical axis is analysis (segmentation) accuracy. A model 701 that is trained using the original image and the processed image that is the processed original image according to the embodiment as teacher data has identification accuracy higher than the identification accuracy of a model 702 trained only using the original images. It is considered that this is because a high-quality teacher image can be artificially created. Note that in the case where no desired identification accuracy is obtained, as in Process 314 in FIG. 2, the process can be again performed with the image processing method or the number of processed images changed.

Figure 8:
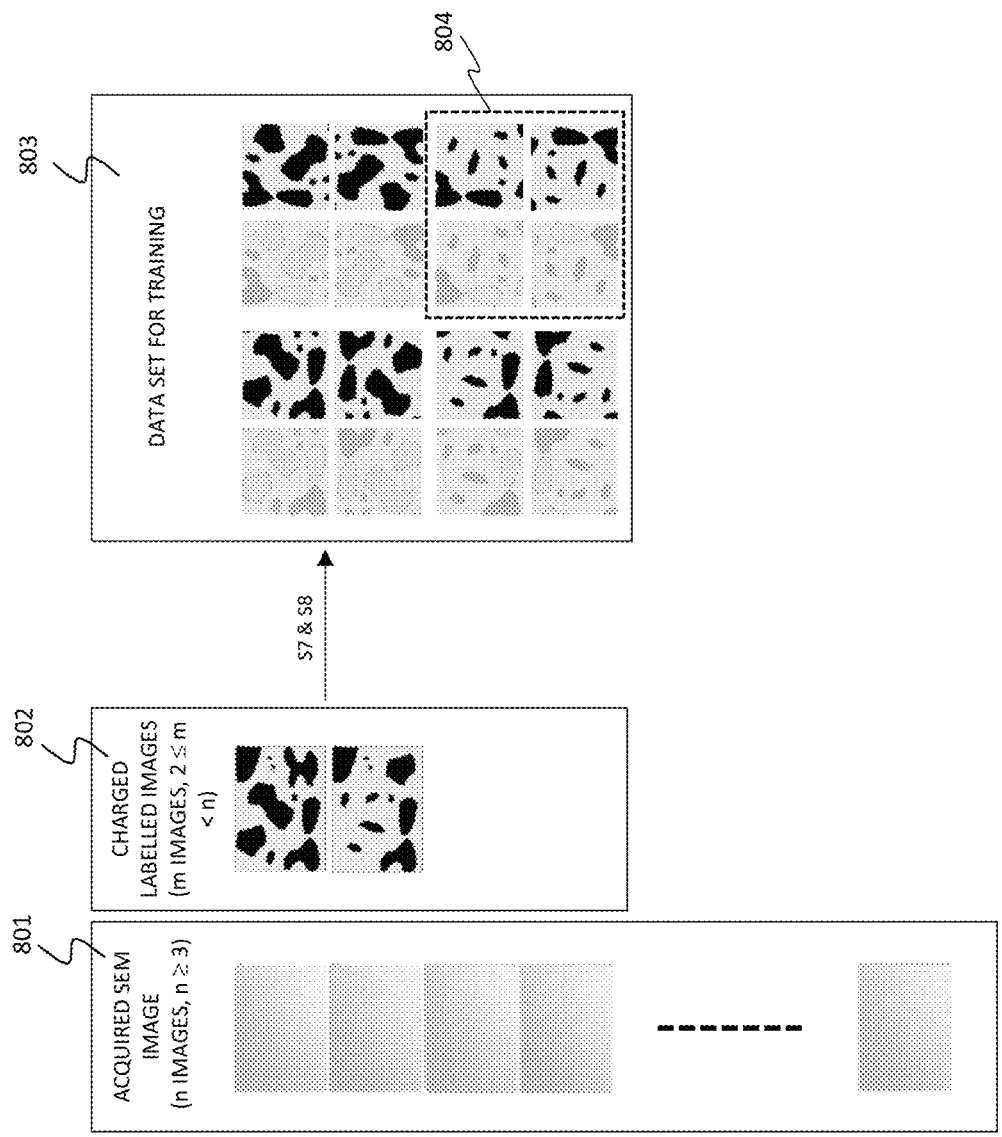
FIG. 8 is a conceptual diagram of showing the concept of processing SEM images according to the embodiment.

FIG. 8 is a diagram showing the concept of processing the SEM image according to the embodiment, n SEM images 801 that are acquired are original images acquired by the SEM in Process S4 (here n=8). Of these images m images are labelled (here m=2), and are read as labelled SEM images 802 in Process S6. For each of the labelled SEM images 802 three processed images are created for example in Process S7 and the labelled SEM images 802 are increased by four times. As a result eight data sets 303 for training (for teacher and accuracy measurement) are created. Some of the data sets 803 are used for training the model and some others 304 are used for the accuracy measurement of the trained model. In order to improve the reliability of accuracy measurement it is favorable that for training and accuracy measurement, images having different original images are selected from n original images. As a result of accuracy measurement in the case where the accuracy of the model is insufficient Process S14 such as (1) an image processing method for creating a processed image is changed (2) the number of processed images to be created is increased (e.g. increase from four times to ten times), and 3) the number of original images to generate teacher data is increased (e.g. Increase from m=2 to 5) is performed, and training is again performed.

After a model of sufficient accuracy is completed unlabelled SEM images in n acquired SEM images 301 can be automatically analyzed using this model. In this manner, effort and costs for image analysis can be greatly reduced.

Second Embodiment

Figure 9:
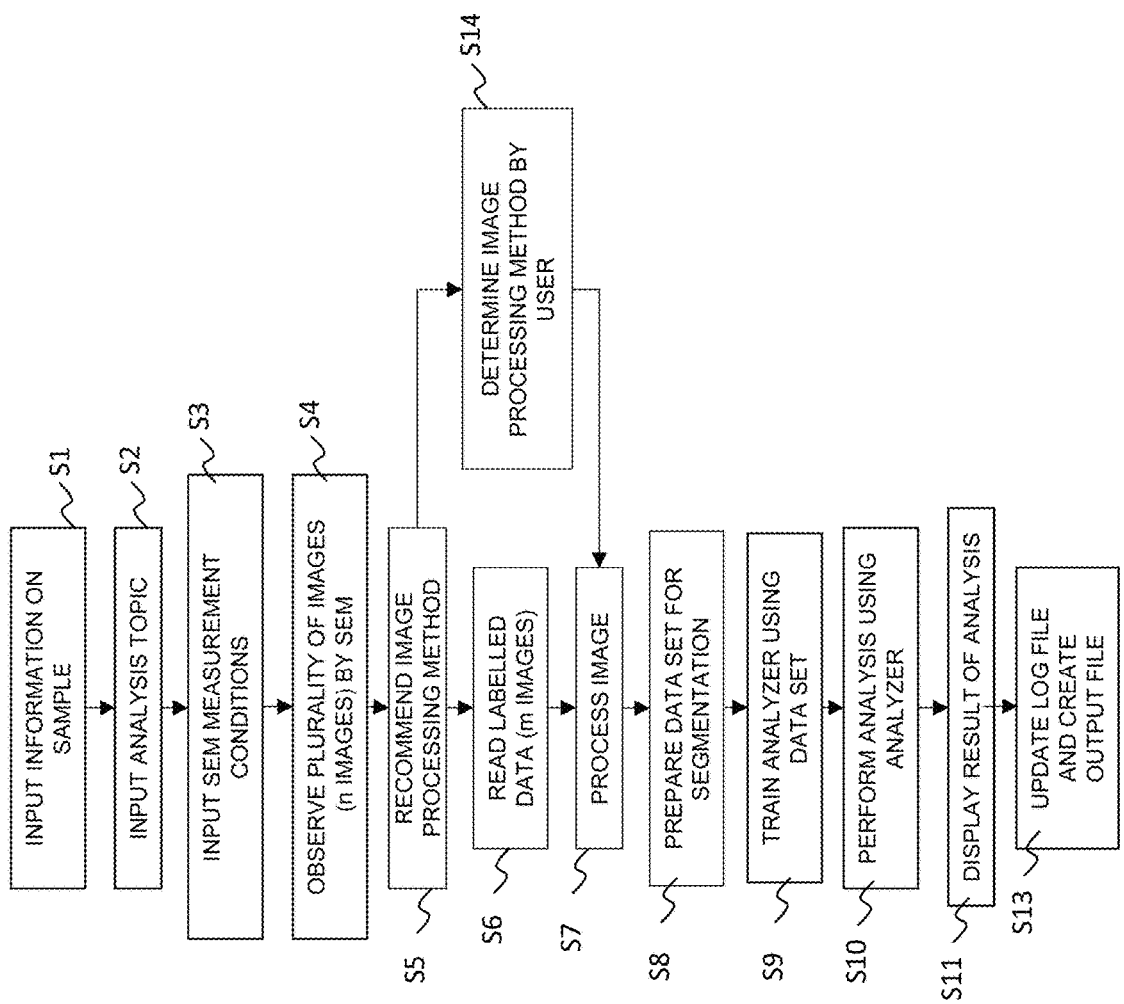
FIG. 9 is a flowchart of substance structure analysis showing overall processing according to a second embodiment.

FIG. 9 is a flowchart of substance structure, analysis showing overall processing according to a second embodiment. In the second embodiment, basic configurations are the same as the first embodiment. Different points are that a processed image by an image processing method recommended in Process S5 is displayed on a GUI and that a user can determine image processing finally performed in Process S14.

Figure 10:
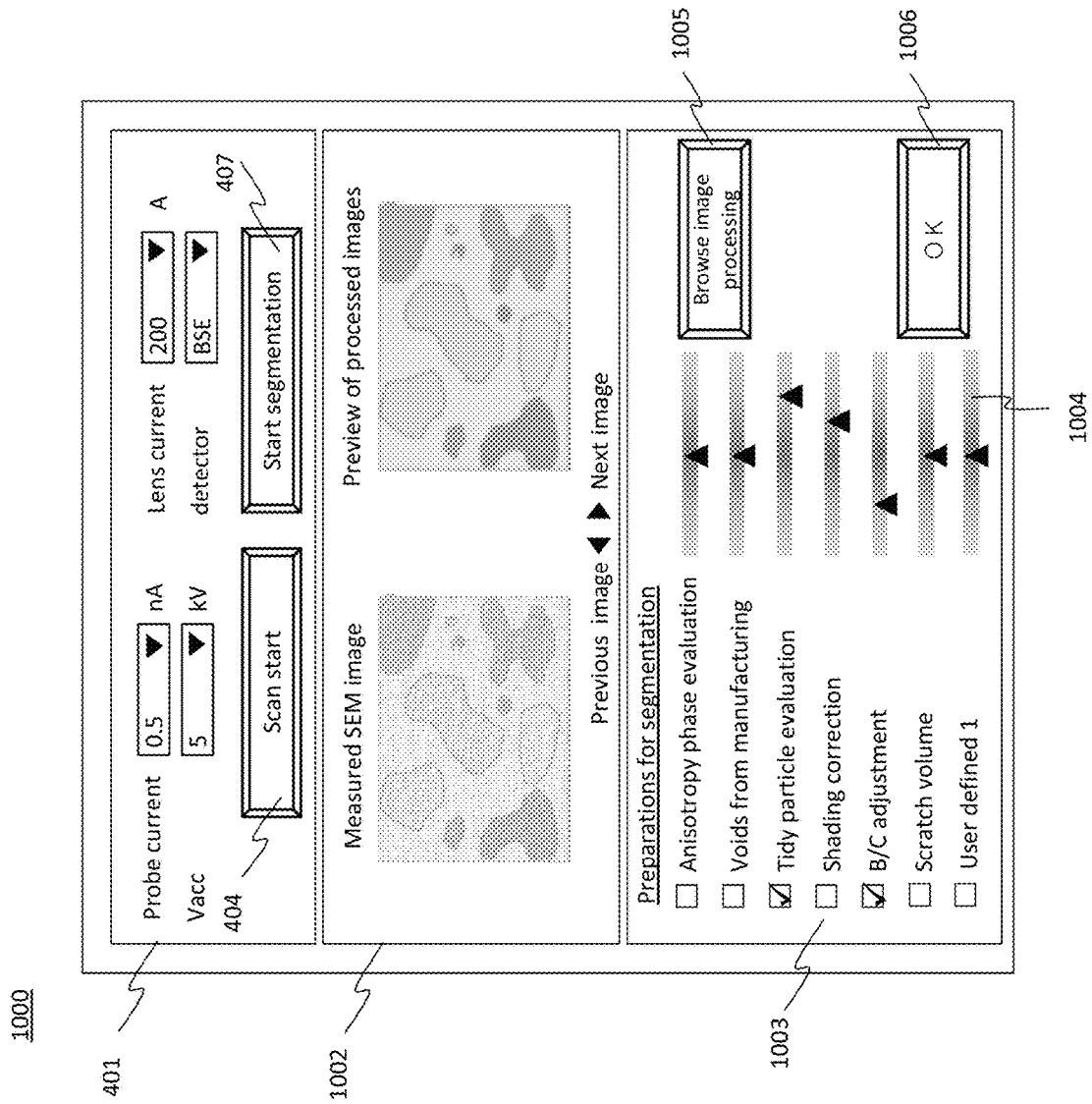
FIG. 10 is a conceptual diagram showing a GUI window displayed to a user.

FIG. 10 is a diagram showing a GUI window 1000 displayed to the user on a terminal 114 in Process S14. A small window 401 is the same as FIG. 4.

On a small window 1002, an observed SEM image (Measured SEM image) and a processed image preview by a recommended image processing method (Preview of processed images) are displayed side by side.

On a small window 1003, a list of image processing methods for preparing segmentation (Preparations for segmentation) and sliders 1004 for adjusting a parameter in each image processing are displayed. In the example in FIG. 10, anisotropy phase evaluation (Anisotropy phase evaluation), voids from manufacturing (Voids from manufacturing), tiny particle evaluation (Tiny particle evaluation), shading correction (Shading correction), brightness/contrast adjustment (B/C adjustment), and a scratch volume (Scratch volume) are defined. The user definition (User defined 1) is also possible. The user operates an operation button (Browse image processing) 1005 to open a new window (not shown), referring to an external database, and can invoke a desired image processing tool.

As a method of processing an original image to increase the number of labelled SEM images, it can be thought that an image is rotated. For example, when one image is rotated at an angle of 90 three times, three images can be newly created. However, this method is not applicable in the case where a sample has orientation. Checking anisotropy phase evaluation invalidates image rotation. In the case where no check is made, a process is performed in which the image is rotated to create a processed image. The image rotation process may be performed in default. The image rotation process can increase the number of processed images.

The voids from manufacturing are micro cavities produced in the preparation of a sample, for example. The frequency of generation of voids is sometimes varied depending on places even in the same sample. The possible range of the frequency of generation of voids is known according to samples. The amount of voids can be changed by artificially generating voids at random by image processing within the possible range of the frequency of generation of voids, and hence the variations of the SEM image can be increased.

Tiny particle evaluation is a process suited to the case where micro deposits are desired to be analyzed. Since the amount of blurring of the image is varied depending on the observation conditions, the amount of blurring of the image is adjusted to create a processed image. In order to adjust the amount of blurring, a smoothing process is performed on the image in the range where the deposit that is an analysis target can be observed. This will be described in a fourth embodiment.

Shading correction is described in the first embodiment. Brightness or contrast adjustment will be described in a third embodiment.

The scratch volume is a line-shaped flaw produced in preparing a sample (polishing, for example). Similarly to the process for voids, the size or the frequency of production of scratches can be artificially changed by image processing. Variations in the preparation conditions in preparing a sample can foe reproduced.

The user selects an image processing method desired to be applied with a check, and sets the process parameter with the slider 1004. Alternatively, another image processing method can also be invoked using an operation button (Brows image processing).

The processed image (Preview of processed images) is displayed on the small window 1002, being interlinked with setting. When the user determines an image processing method, the user determines the image processing method by operating an OK button 1006.

According to the embodiment, the processed image suited to the teacher database can be created with user knowledge utilized. Note that the system may be automatically determine the image processing method described above, without selecting any image processing method by the user, unlike the first embodiment.

Third Embodiment

In the present embodiment, the process flow is similar to FIG. 2 of the first embodiment. The embodiment is an example of creating SEM images that are assumed to be acquired on different days or at different times in the image processes (S5 to S7) in FIG. 2. Image processing for this is performed based on Expression 2 below. This Expression 2 is included in image processing data 1102.

$$\text{Brightness(or Contrast)} \propto f2(WD) \times Ip \times f3(G) \times f4(V_{acc}) \quad \text{Expression 2}$$

Brightness (or Contrast) is brightness (or a contrast).
Ip is the current value of an electron gun.
G is the gain of a detector.
$V_{acc}$ is an accelerating voltage.
f2, f3, and f4 are functions depending on an SEM.

Generally, it is known that the electric current Ip of an electron gun 101 fluctuates over operating time, and the properties depend on the specifications of an SEM for use. In the description, supposing that f2(WD), f3(G), and f4($V_{acc}$) are fixed (constant). Expression 2 can be written as below.

$$\text{Brightness(or Contrast)adjustment} \propto Ip(t) \quad \text{Expression 3}$$

FIG. 11A is a graph diagram showing SEM operating time t on the horizontal axis and the electric current Ip of the electron gun 101 on the vertical axis. The origin point (0) of the time is a point in time at which the switch of the GEM is turned ON. In Expression 3, Ip fluctuates over time t as described above. f2, f3, and f4 are known, depending on the device. Such properties can be recorded in advance by acquiring SEM operation data. WD, G, $V_{acc}$ can be acquired as the conditions in observation. Now, supposing that WD, G, are fixed, the electric current Ip has the correlation with the brightness of the SEM image, and hence the relationship between time t and the brightness can be derived.

FIG. 11B shows the SEM operating time t on the horizontal axis and the brightness of the SEM image on the vertical axis. From the relative value, the highest brightness is 100, and the lowest brightness is zero. SEM operating time t1 at which the SEM image is acquired is known. Therefore, the SEM image obtained at time point t2 other than time t1 at which the original image is acquired can be created by processing the original image, using the relationship in FIG. 11B.

For example, supposing that the original image is acquired at timing of t1, t2, and t3 and the brightness obtained from the relationship between time t and the brightness at these time points is respectively 70, 60, and 50. The adjustment range of the brightness for creating the processed image ranges from 50 to 70. From the original image acquired at timing of t1, processed images at time points t2 and t3 can be created by image processing where the brightness is 6/7 and 5/7. From the original image acquired at timing of t2, processed images at time points t1 and t3 can be created by image processing where the brightness is 7/6 and 5/6. From the original image acquired at timing of t3, processed images at time points t1 and t2 can foe created by image processing where the brightness is 7/5 and 6/5.

As described above, one or a plurality of processed images can be created from the original image. How many processed images are created from one original image can be determined depending on how many types of processed images are created in the adjustment range of the brightness. For example, the user can freely register or change the adjustment range, intervals in the adjustment range, and the number of processed images to be created, for example.

In this manner, the created SEM image can be used as teacher data in a set with labeling of the original image. At this time, the teacher database can also be formed together with teacher data from the original image, or the teacher database can be configured only of the created SEM image assuming the time point t2.

Note that the image has only brightness. However, the operation of image processing includes the operations of brightness and contrast. Brightness is the shift of brightness (negative or positive overall). Contrast changes the distribution of brightness. For example, the brightness in the image is changed from the brightness of 50 to 80 to the brightness of 0.100 to 130 by brightness processing. In contrast processing, the brightness is changed from the brightness of 50 to 80 to 40 to 100.

As an exemplary modification of Expression 2, there is Expression 2-2.

$$\text{Brightness(or Contrast)} \propto f2(WD) \times Ip \times f3(G) \times f4(V_{acc}) \times f8(G_{digital}) \quad \text{Expression 2-2}$$

In Expression 2-2, $f8(G_{digital})$ is added to Expression 2. $G_{digital}$ is a digital gain, or digital brightness, or digital contrast, for example, set in SEM image acquisition. That is, $G_{digital}$ is a parameter that can be changed by electronic signal processing on the device side in SEM image acquisition. Although the SEM image can be acquired without $G_{digital}$, $G_{digital}$ can be set in a typical system.

Fourth Embodiment

In the present embodiment, a process flow is similar to FIG. 2 of the first embodiment. In order to reproduce the amount of blurring of the SEM image, a smoothing process is applied to the SEM image. For the smoothing process, a smoothing filter only has to be is applied. In image processing by the smoothing filter, the weighted sum of the pixel values of pixels around the corresponding pixel is computed for each pixel of the SEM image, and the weighted sum is the pixel value of the corresponding image.

In Process S5 in FIG. 2, a parameter that determines the content of image processing includes what range is used as the pixels around the corresponding pixel or what degree of weight is used.

At this time, in the case where a deposit is evaluated, the smoothing amount in the range where a deposit can be seen (i.e., a deposit can be analyzed by the analysis model) has to be calculated. Expression 4 is an exemplary expression that, defines the smoothing level for image processing based on the observation conditions and information on a sample. This Expression 4 is included in the image processing data 1102.

$$\text{Smoothing level} \propto f5(\text{average size of particle}) \times f6 \\ (SEM \text{ magnification}) \times f7(\text{image size}) \quad \text{Expression 4}$$

Smoothing level is the smoothing level of the SEM image.
The average size of particle is the average size of particles in the SEM image.
SEM magnification is SEM magnification.
The image size is the size of the SEM image.
f5, f6, and f7 are functions depending on the SEM. Here, the smoothing level of the SEM image defines the range of pixels around the corresponding pixel.

According to the embodiment described above, the processed image is created from a small amount of observation images (original images), and hence a large amount of teacher data can be constructed. Thus, the number of SEM images to be acquired by the SEM, for example, can be reduced. The number of man-hours for labeling on the SEM image can foe reduced as well.

In the embodiment, the original image is processed based on the observation conditions in original image acquisition and the specifications of the observation device that acquires the original image. Therefore, the processed image equivalent to the image actually observed through the observation device can be created. Therefore, the correspondence of the input x of teacher data created from the processed image with the correct output t for the input x is appropriate, and hence the identification accuracy of the model trained using this teacher data is kept, from degrading as well.

What is claimed is:

1. An information processing system that creates a teacher database configured to train an analysis model from an observation image and labeling information corresponding to the observation image using an information processor, the information processing system comprising:
   a storage unit;
   an image processing unit; and
   a teacher database creating unit,
   wherein the storage unit stores:
      image processing data formed of information showing a relationship between an observation condition for the observation image and a parameter relating to the observation image; and
      a first observation image, a first observation condition corresponding to the first observation image, and first labeling information corresponding to the first observation image,
   the image processing unit accepts the first observation image and the first observation condition as inputs, performs image processing corresponding to the parameter to the first observation image based on the image processing data, and creates a second observation image corresponding to a second observation condition, and
   the teacher database creating unit creates the teacher database from the second observation image and the first labeling information.

2. The information on processing system according to claim 1,
   wherein the first observation image is an SEM image,
   the first observation condition is an operation condition of an SEM, and includes at least, one of an electric current of an electron gun, an accelerating voltage that extracts electrons from the electron gun, an operation current of an objective lens, a working distance, magnification, an image size, and an operation method of a detector, and
   the first labeling information is segmentation information on an SEM image.

3. The information on processing system according to claim 2, wherein the first observation condition includes a function specified, depending on the SEM.

4. The information on processing system according to claim 1, wherein the parameter relating to the observation image is a parameter that adjusts shading of the observation image.

5. The information on processing system according to claim 1, wherein the parameter relating to the observation image is a parameter that adjusts brightness of the observation image.

6. The information on processing system according to claim 1, wherein the parameter relating to the observation image is a parameter that adjusts a smoothing level of the observation image.

7. The information on processing system according to claim 2, wherein the parameter relating to the observation image is a parameter that adjusts a frequency of generation of voids in the SEM image.

8. The information on processing system according to claim 2, wherein the parameter relating to the observation image is a parameter that adjusts a frequency of generation of a scratch in the SEM image.

9. The information on processing system according to claim 2,
   wherein the storage unit stores:
      image processing data formed of information showing a relationship of an observation condition for the observation image and information on an observation target of the observation image with a parameter relating to the observation image; and
      a first observation image, a first observation condition corresponding to the first observation image, first labeling information corresponding to the first observation image, and information on an observation target of the first observation image, and
   the image processing unit accepts the first observation image, the first observation condition, and information on the observation target of the first observation image as inputs, performs image processing corresponding to the parameter to the first observation image based on the image processing data, and creates a second observation image corresponding to a second observation condition.

10. The information on processing system according to claim 9, wherein the information on the observation target of the observation image is an average particle size in the SEM image.

11. The information on processing system according to claim 1, wherein as image processing for the first observation image, the image processing unit is selectable whether the image is rotated.

12. An information processing method of creating a teacher database configured to train an analysis model from an observation image and labeling information corresponding to the observation image using an information processor,
wherein the method uses a storage unit, an image processing unit, and a teacher database creating unit,
the storage unit stores:
image processing data formed of information showing a relationship between an observation condition for the observation image and a parameter relating to the observation image; and
a first observation image, a first observation condition corresponding to the first observation image, and first labeling information corresponding to the first observation image,
the image processing unit accepts the first observation image and the first observation condition as inputs, performs image processing corresponding to the parameter to the first observation image based on the image processing data, and creates a second observation image corresponding to a second observation condition, and
the teacher database creating unit creates the teacher database from the second observation image and the first labeling information.

13. The information processing method according to claim 12,
wherein the first observation image is an SEM image,
the first observation condition is an operation condition of an SEM, and includes at least one of an electric current of an electron gun, an accelerating voltage that extracts electrons from the electron gun, an operation current of an objective lens, a working distance, magnification, an image size, and an operation method of a detector, and
the first labeling information is segmentation information on an SEM image.

14. The information processing method according to claim 13, wherein the parameter relating to the observation image is at least one of a parameter that adjusts shading of the observation image, a parameter that adjusts brightness of the observation image, a parameter that adjusts a smoothing level of the observation image, a parameter that adjusts a frequency of generation of voids in the SEM image, and a parameter that adjusts a frequency of generation of a scratch in the SEM image.

15. The information processing method according to claim 12, comprising:
using two types of images as the first observation image to create two types of the second observation images;
creating a first data set and a second data set from two types of the second observation images and two types of pieces of the first labeling information;
training the analysis model with the first data set; and
performing accuracy measurement of the analysis model trained with the second data set.

* * * * *